Jan. 26, 1954 — L. E. RUSSELL — 2,667,083

HORN RING

Filed July 21, 1950

Inventor
Linus E. Russell

Tom Walker
Attorney

Patented Jan. 26, 1954

2,667,083

UNITED STATES PATENT OFFICE 2,667,083

HORN RING

Linus E. Russell, Springfield, Ohio, assignor to Peters & Russell, Inc., Springfield, Ohio, a corporation of Ohio Application July 21, 1950, Serial No. 175,060

10 Claims. (Cl. 74—484)

1

This invention relates to horn rings, as mounted on automobile steering wheels to provide for remote depression of the horn button from adjacent the rim of the wheel and along the spokes.

While adaptable for factory installation as an integral part of the steering wheel, the horn ring of the invention has particular application as an accessory, individually purchased and installed by the car owner.

A particular object of the invention is to achieve a hitherto unknown adaptability in horn rings, the instant ring being adapted for use on the two spoke or three spoke steering wheel and easily adjustable to conform to a T or Y arrangement of the three spoke wheel.

Another object of the invention is to enable the horn ring to be adjusted to compensate for variations in height of the horn button.

A further object of the invention is to produce a horn ring which is simply and inexpensively made and which accordingly can be offered for sale at a low selling price.

Still another object of the invention is to present an attractively styled horn ring having the advantageous features noted above and which can be mounted on the steering wheel without the exercise of any special skill.

A further object of the invention is to provide a horn ring possessing the advantageous structural features, the inherent meritorius characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is found the preferred but obviously not necessarily the only form of embodiment of the invention, Fig. 1 is a view in perspective of a horn ring in accordance with the instant invention;

2

Figure 1:
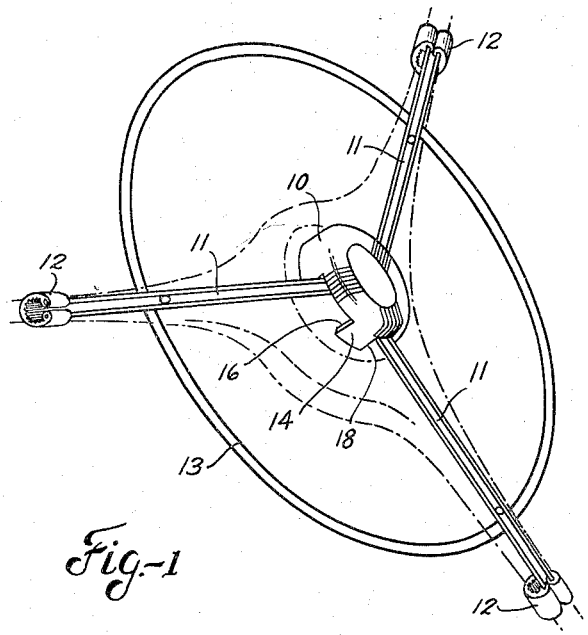
Figure 3:
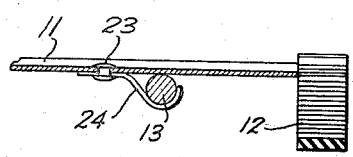
Fig. 3 is a detail view, in section, showing the manner of attaching the arms to the ring.
Figure 4:
Fig. 4 is an end view of an arm, with a resilient installation strap mounted thereon.
Figure 5:
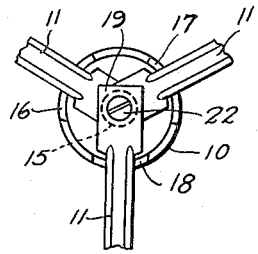
Fig. 5 is a bottom plan view of the central head member, showing the manner of attachment of the arms thereto.
Figure 2:
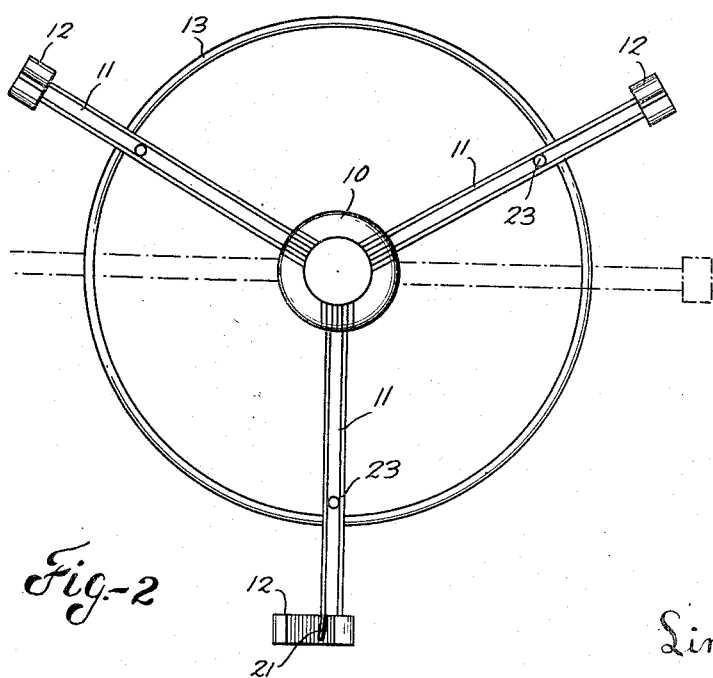
Fig. 2 is a top plan view of the horn ring, showing how the arms thereof appear in three spoke T and three spoke Y arrangements.

Like parts are indicated by similar characters of reference throughout the several views.

Referring to the drawings, a horn ring in accordance with the instant invention, comprises a central cap or head member 10 to overlie the horn button, radial arms 11 to be aligned with the spokes of the steering wheel, attachment straps 12 on the outer ends of the arms 11 to engage the spokes, and a ring 13 surrounding the head member 10 and connected to the arms 11 inwardly of the outer ends thereof.

The head member 10 may be conveniently made in one piece as a decorative molded plastic part. It is circular in shape, with its peripheral edge turned down to define a flange 14, the horn ring assembly being installed with the flanged side of member 10 resting on the horn button. Interiorly the head member 10 presents an axial screw 15 while the flange 14 is formed with circumferentially spaced cut-out portions or slots 16, 17 and 18. The slots 16 and 17 are elongated with respect to the slot 18.

The arms 11 may, as in the illustrated instance, be made as thin metal stampings presenting at their one ends broad, flat portions 19 and at their other ends parallel projecting prongs 21. The former or inner ends of the arms 11 are received in the head member 10 and have openings to register with the screw socket 15, the several portions 19 being arranged in superimposed relation with their respective openings registering with one another and with the screw socket 15. A screw 22, inserted through the several arm portions 19 and into the socket 15, holds the arms and head member 10 in connected relation and further serves as pivot, allowing the arms to be swung relatively to the head member in the transverse plane thereof.

The prongs 21 on the outer ends of the arms 11 serve as mounting means for the straps 12 which are resilient elements made of rubber or rubberlike material. The opposite ends of the straps 12 have openings or recesses to receive the prongs 21, and, as installed thereon, are suspended as loops from the ends of arms 11. That side of the strap which becomes the internal surface of the loop may be longitudinally grooved or corrugated, as shown, for better gripping engagement with the wheel spoke.

Intermediate their ends the arms 11 are approximately channel shaped. Fastened, as by rivets 23, to the underside of the arms are clamps 24 arranged to engage and support the ring 13. The clamps 24 extend as fingers into underlying, embracing relation to the ring 13, holding the ring in firm, frictional contact with the arms 11 yet permitting relative sliding motion therebetween. The clamps are mounted in equidistant, predetermined relation to the ends of the arms 11 in such way as to locate the ring 13 in concentric, surrounding relation to the head member 10.

An assembled horn ring, therefore, appears as in Fig. 1, with the inner ends of the arms 11 attached to the central head member 10 and the arms radiating outward through the slots 16, 17 and 18 to engaging and supporting relation with the ring 13 and the straps 12.

Steering wheels conventionally present two or three spokes. In the two spoke arrangement, the spokes are aligned in a horizontal direction to define a substantially continuous transverse bar. In the three spoke arrangement, one spoke extends vertically from the bottom of the wheel to the center horn area while the other two spokes radiate from such area either in horizontal alignment with one another or in oppositely inclined relation. Graphically, therefore, a three spoke wheel is sometimes in the form of a T and sometimes in the form of a Y.

The instant horn ring is supplied with three arms 11. As installed on a three spoke wheel, the ring assembly is mounted to align that arm 11 which projects through slot 18 with the vertical spoke. The other arms 11 then are adjusted about the pivot screw 22 into alignment with the other spokes and all the arms are strapped to the spokes. The elongated formation of the slots 17 and 18 is provided to permit adjustment of the arms to either the T-shape or Y-shape, as may be required. In the case of a two spoke wheel, the vertical arm 11 is detached from the assembly by engagement with the ring 13. The clamps 24 have a limited resilience, permitting such attachment and detachment of the arms.

In engaging the straps 12 with the spokes, one end of the strap is removed from a prong 21, passed around the spoke and reattached to the prong. The spoke is accordingly engaged in a relatively thick resilient cushion which precludes noisy vibration in the horn ring. It will be understood that the construction of the horn ring is such as to enable limited flexure of the arms 11 and ring 13 about the points of attachment to the spokes, resulting in depression of the horn button by the head member 10. Further, and in accordance with the present invention, the metal stamping of which the arms 11 are formed permit comparatively easy deforming thereof. Variations in the height of the horn button may, therefore, be compensated for by correspondingly bending the arms 11.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A horn ring for mounting on steering wheels, including a central head member to overlie the horn button, a plurality of arms radiating from said head member, resilient attachment means at the outer end of each arm to engage a spoke of the steering wheel, a ring surrounding said central head member and intersecting the planes of said arms, and a clamp on each of said arms frictionally engaged with and supporting said ring.

2. A horn ring for mounting on steering wheels, including a central head member to overlie the horn button, a plurality of radial arms attached at their inner ends to said head member for relative swinging motion in the same horizontal plane as said head member whereby said arms may be aligned with the spokes of the steering wheel, resilient attachment means at the outer ends of said arms to engage said spokes, and a ring surrounding said head member and supported by said arms for relative sliding movement.

3. A horn ring according to claim 2, characterized in that said ring is supported by clamp arms fastened to said arms and extending into underlying frictional contact with said ring.

4. A horn ring for mounting on steering wheels, including a central head member to overlie the horn button, a plurality of arms pivotally connected at their one ends to said head member for swinging movement in the same horizontal plane as said head member about said member to be aligned with the spokes of the steering wheel, resilient attachment means on the opposite ends of said arms to engage said spokes, a ring surrounding said head member, and friction clamps connecting said ring to said arms.

5. A horn ring for mounting on steering wheels, including a head member to overlie the horn button, a plurality of arms radiating from said head member, attachment means connecting the inner ends of said arms to said head member for independent pivotal motion of said arms about said head member to align said arms with the spokes of the steering wheel, said attachment means being releasable for the independent removal of said arms, a ring surrounding said head member, friction clamps connecting said ring to said arms, and resilient straps on the outer ends of said arms to connect said arms to the spokes of the steering wheel.

6. A horn ring according to claim 5, characterized in that said arms are unitary stamped metal parts presenting on their outer ends projecting prongs to receive and support said straps.

7. A horn ring for mounting on steering wheels, including head member to overlie the horn button, said member presenting an inturned peripheral flange to rest on the horn button and an inwardly projecting axial screw socket, radial slots in the flange on said head member, a plurality of arms having their inner ends in superimposed relation to one another on said screw socket and extending radially outward through said slots, a screw extending through said arms and into said socket, said screw providing a pivot about which said arms may be individually adjusted for alignment with the spokes of the steering wheel, resilient attachment means on the outer ends of said arms to engage said spokes, a ring surrounding said head member, and clamp fingers on said arms extending in embracing relation to said ring and maintaining a frictional sliding contact of said ring with said arms.

8. A horn ring according to claim 7, characterized in that said clamp fingers are yieldable so that upon removal of said pivot screw said arms may be individually detached from and replaced in the horn ring assembly.

9. A horn actuator for mounting on steering wheels, including a central head member to overlie the horn button, a plurality of arms extending radially from said head member, attachment means common to said arms connecting the inner ends of said arms to said head member for independent pivotal motion of said arms about said head member in the same horizontal plane as said head member to align said arms with the spokes of the steering wheel, said attachment means being releasable for the independent removal of said arms, and a resilient attachment means at the outer end of each arm to engage a spoke of the steering wheel.

10. A horn actuator according to claim 9, characterized in that said central head member is formed with an inturned peripheral flange to rest on the horn button, said flange having relatively elongated radial slots receiving the inner ends of said radially extending arms.

LINUS E. RUSSELL.

References Cited in the file of this patent

UNITED STATES PATENTS

| Number | Name | Date |
|---|---|---|
| 2,109,550 | Rapuano | Mar. 1, 1938 |
| 2,131,542 | Peters | Sept. 27, 1938 |
| 2,147,007 | Peters | Feb. 14, 1939 |
| 2,175,206 | Lyon | Oct. 10, 1939 |
| 2,276,477 | George | Mar. 17, 1942 |

OTHER REFERENCES

"1939 Style Leaders," Peters & Russell Inc., Springfield, Ohio.